US007227465B2

(12) United States Patent
Meyer

(10) Patent No.: US 7,227,465 B2
(45) Date of Patent: Jun. 5, 2007

(54) SECURITY BAR WITH FIBER OPTIC CABLE BASED SECURITY MONITORING

(75) Inventor: John Allen Meyer, Charlotte, NC (US)

(73) Assignee: Lucent Technologies Inc., Murray Hill, NJ (US)

( * ) Notice: Subject to any disclaimer, the term of this patent is extended or adjusted under 35 U.S.C. 154(b) by 174 days.

(21) Appl. No.: 11/045,647

(22) Filed: Jan. 28, 2005

(65) Prior Publication Data

US 2006/0181418 A1 Aug. 17, 2006

(51) Int. Cl.
*G08B 21/00* (2006.01)
*G08B 13/18* (2006.01)
*H01J 3/14* (2006.01)
*G01J 1/04* (2006.01)

(52) U.S. Cl. ...................... 340/550; 340/540; 340/541; 340/555; 250/216; 250/227.11; 250/227.14; 250/227.16

(58) Field of Classification Search ........ 340/540–541, 340/550, 555; 250/216, 227.11, 227.14, 250/227.16
See application file for complete search history.

(56) References Cited

U.S. PATENT DOCUMENTS 4,538,527 A * 9/1985 Kitchen ....................... 109/21
4,586,030 A * 4/1986 Klostermann ............... 340/550
4,680,573 A * 7/1987 Ciordinik et al. ........... 340/541
4,701,614 A * 10/1987 Jaeger et al. .......... 250/227.14
4,777,476 A * 10/1988 Dank ......................... 340/541
4,922,228 A * 5/1990 Jacobson .................... 340/550
5,267,688 A 12/1993 Benefield ...................... 232/17
5,340,172 A 8/1994 Sweet ........................ 292/259
5,592,149 A * 1/1997 Alizi .......................... 340/550
5,678,871 A 10/1997 Zarzycki ..................... 292/346
5,791,173 A 8/1998 Montes ........................ 70/101
5,893,594 A 4/1999 Zarzycki ..................... 292/346
6,619,079 B2 9/2003 Cheung ....................... 70/57.1
6,634,681 B1 10/2003 Redden ........................ 292/92

FOREIGN PATENT DOCUMENTS

EP 0 970 289 B1 8/2003

* cited by examiner

*Primary Examiner*—Daniel Wu
*Assistant Examiner*—Lam Pham
(74) *Attorney, Agent, or Firm*—Kenneth M. Brown

(57) ABSTRACT

A security bar providing improved security from breach is obtained with the use of a fiber optic cable longitudinally inserted in a hollowed out cavity thereof. Monitoring of the security bar to identify attempts at breach thereof may be achieved by connecting an optical light source to one end of the fiber optic cable and a light monitoring device (i.e., an optical receiver) at the other end. In this manner, a breach of the security bar is identified when the optical receiver fails to receive the light generated by the optical light source. In one embodiment, an isolator which consists of a material that is soft enough to absorb a potential shock but hard enough to break or splinter if the security bar is substantially deformed (e.g., wood) surrounds the fiber optic cable.

13 Claims, 2 Drawing Sheets

SECURITY BAR WITH FIBER OPTIC CABLE BASED SECURITY MONITORING

FIELD OF THE INVENTION

The present invention relates generally to the field of security and more particularly to a security bar providing improved security from physical breach as a result of having a security monitoring capability based on fiber optic cable embedded therein.

BACKGROUND OF THE INVENTION

Most security bars, such as those used in prisons, banks, vaults, jewelry stores, museums and other barred windows, comprise a solid bar made of an appropriately strong metal such as iron or steel. Most typically, the biggest threat to the breach of security of a security bar is a hacksaw or similar tool, which is used to cut completely through the security bar, thereby rendering it useless.

In co-pending U.S. patent application Ser. No. 10/745,884, "Security Bar With Multiple Internal Rolling Bars And Electronic Monitoring," filed on Dec. 26, 2003 by John A. Meyer (the inventor of the present invention) and commonly assigned to the assignee of the present invention, a security bar providing improved security from breach using a plurality of free rolling inner bars was described. In addition, U.S. patent application Ser. No. 10/745,884 also taught a method for electronically monitoring such security bars with the use of electrically conducting wiring. Specifically, such electrically conducting wiring could be advantageously connected into an electronic circuit such that the breach of the security bar—for example, as a result of a successful attempt to cut through the bar—resulted in a breach of the electrical conductivity of the wiring in the security bar. This breach would then be electronically detectable by the electronic circuit, thereby alerting appropriate authorities to the breach of the security bar. U.S. patent application Ser. No. 10/745,884 is hereby incorporated by reference as if fully set forth herein.

Despite the clear advantages of providing electronic monitoring of a security bar in the manner taught in U.S. patent application Ser. No. 10/745,884, such an approach does have some limitations. First, it is possible for someone attempting to breach the security bar (e.g., a thief or prison break accomplice) to create an electrical "short circuit" around the bar prior to cutting through it, thereby rendering the electrical conductivity within the security bar irrelevant to the overall electrical monitoring circuitry. In addition, even though such security bars are typically quite strong, any electrical conductivity within the security bar will most likely not be disturbed by merely deforming (i.e., bending) the bar—as opposed to breaking or cutting through it—thereby leaving the bar susceptible to such a breach by deformation.

Therefore, it would be highly desirable to provide a security bar which eliminates these limitations of the security bar of U.S. patent application Ser. No. 10/745,884, and which provides a more robust and secure monitoring against possible breach thereof.

SUMMARY OF THE INVENTION

In accordance with the principles of the present invention, a security bar providing improved security from breach is obtained with the use of a fiber optic cable longitudinally inserted in a hollowed out cavity thereof. In accordance with one illustrative embodiment of the present invention, security monitoring of such a security bar to identify attempts at breach thereof may be advantageously achieved by connecting an optical light source to one end of the fiber optic cable and a light monitoring device (i.e., an optical receiver) at the other end. In this manner, a breach of the security bar may be advantageously identified when the optical receiver fails to receive the light generated by the optical light source. In accordance with one illustrative embodiment of the present invention, an isolator which consists of a material that is advantageously soft enough to absorb a potential shock but hard enough to break or splinter if the security bar is substantially deformed (i.e., bent), advantageously surrounds the fiber optic cable.

DETAILED DESCRIPTION OF THE ILLUSTRATIVE EMBODIMENTS

Figure 1:
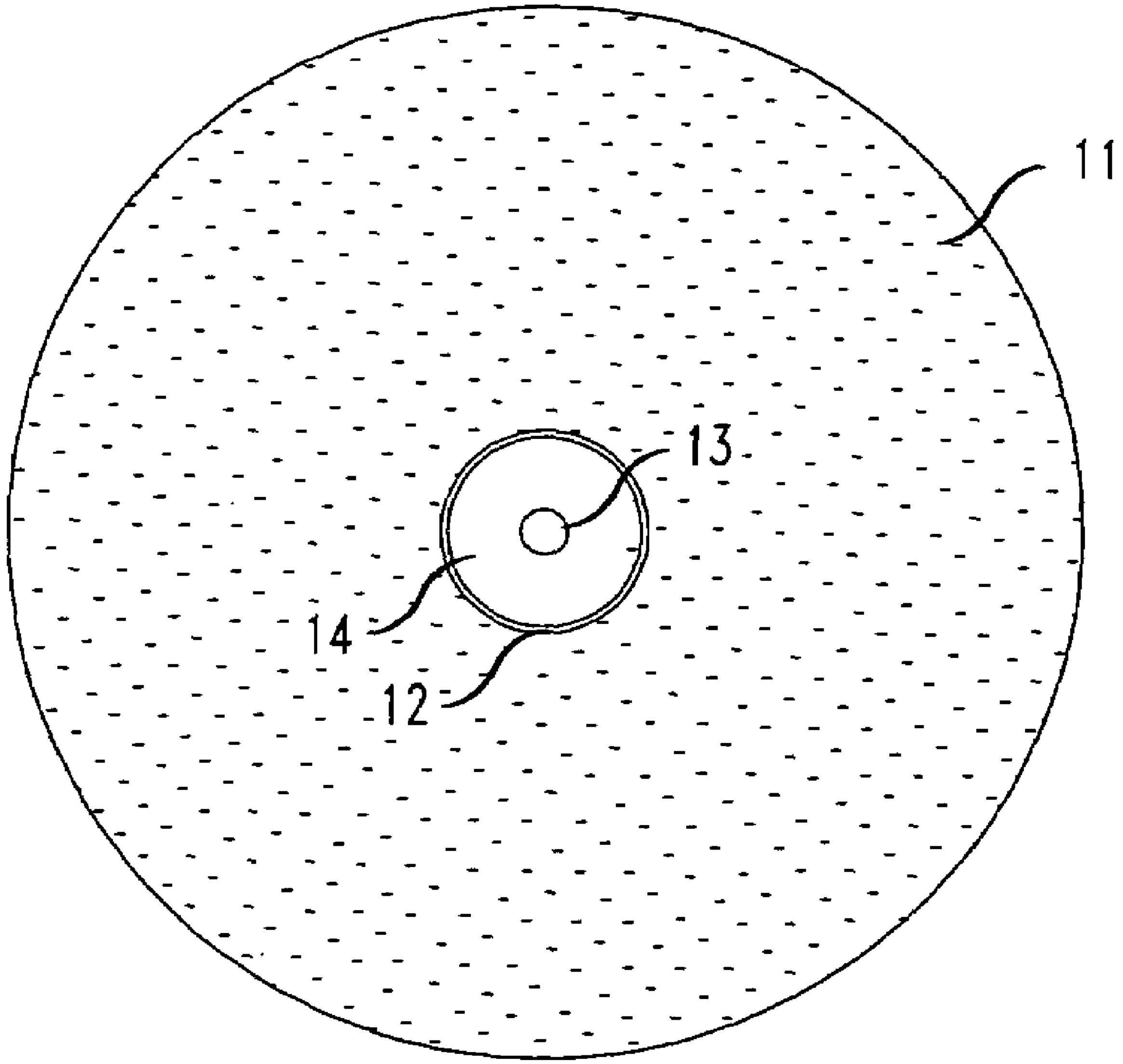
FIG. 1 shows a security bar having an embedded fiber optic cable running longitudinally therein in accordance with an illustrative embodiment of the present invention.

FIG. 1 shows a security bar having an embedded fiber optic cable running longitudinally therein in accordance with an illustrative embodiment of the present invention. The figure shows the security bar body 11—the main body of the bar—which is advantageously comprised of a material which preferably has significant "hardness" in order to enhance security. Illustrative materials for use as the main body of the security bar include, for example, iron and steel.

Inside the main body of the bar, longitudinally positioned (preferably) at the center of the bar is circular chamber 14 (i.e., a hollow cavity) surrounded by isolator 12. Isolator 12 is preferably an elongated cylindrical element which consists of a material that advantageously is soft enough to absorb a potential shock but hard enough to break or splinter if the security bar is substantially deformed (i.e., bent). In accordance with one illustrative embodiment of the present invention, isolator 12 is comprised of a material such as, for example, wood.

Finally, within hollow chamber 14 (surrounded by isolator 12) is fiber optic cable 13, longitudinally positioned within the chamber. Fiber optic cable 13 is a conventional fiber optic cable, fully familiar to those of ordinary skill in the art, able to pass optical signals (e.g., light waves) therethrough. The fiber optic cable running longitudinally through the security bar is advantageously exposed at the two opposing ends of the bar, to thereby enable the connection of one end to an optical light source (e.g., a light emitting diode, or LED) and the other end to an optical receiver (e.g., a light sensor). (Alternatively, both ends may be connected to devices capable of both generating and receiving optical signals.) Note that the breaking or splintering of isolator 12 which results when the security bar is substantially deformed (i.e., bent) will most likely result in the advantageous breaking of the fiber (i.e., fiber optic cable 13), thereby breaking the optical signal path between the two exposed ends of the fiber optic cable at the opposing ends of the bar. In addition, note that it is generally not possible to cut or splice fiber optic cable without interrupting the optical signal path through it, thereby making breach of the security bar by either deforming or cutting the bar easily detectable in accordance with the principles of the present invention.

Figure 2:
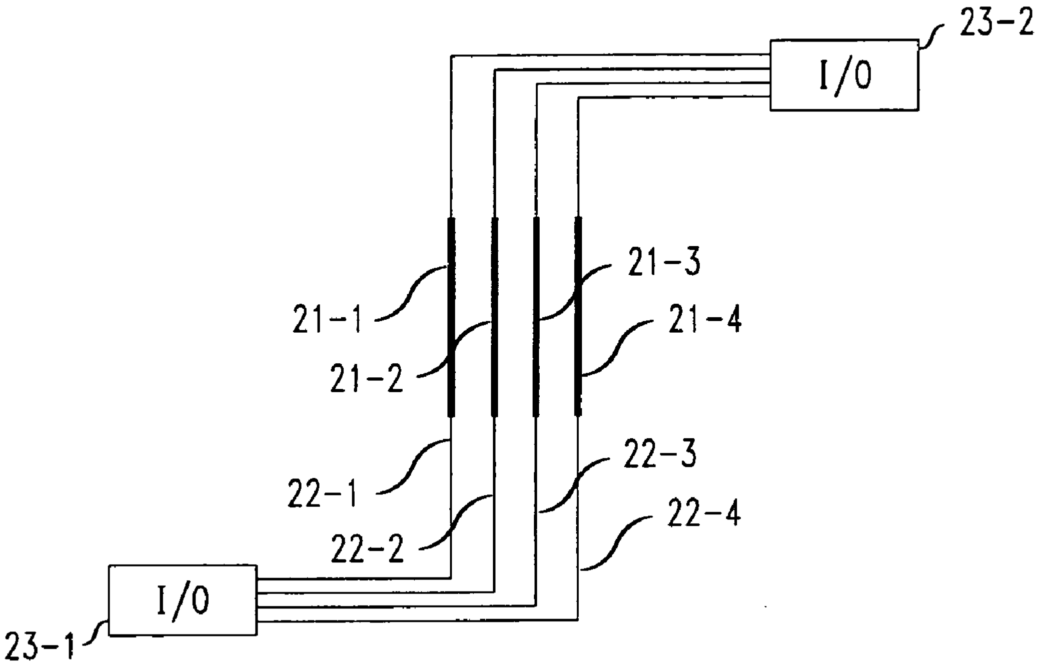
FIG. 2 shows a first illustrative system for performing security monitoring with use of a plurality of security bars with fiber optic cable embedded therein in accordance with one illustrative embodiment of the present invention.

FIG. 2 shows a first illustrative system for performing security monitoring with use of a plurality of security bars with fiber optic cable embedded therein in accordance with one illustrative embodiment of the present invention. The figure shows the first illustrative system comprising four individual security bars (i.e., security bar 21-1, security bar 21-2, security bar 21-3, and security bar 21-4) each having a corresponding fiber optic cable (i.e., fiber optic cable 22-1, fiber optic cable 22-2, fiber optic cable 22-3, and fiber optic cable 22-4) embedded therein according to the principles of the present invention.

In addition, the figure shows the first illustrative system comprising two optical input/output devices (i.e., optical input/output device 23-1 and optical input/output device 23-2), each of which is advantageously capable of generating a plurality of optical signals (i.e., light waves) and of detecting the presence or absence of such an optical signal on a plurality of optical signal input lines. That is, each optical input/output device comprises a combination of a (multiple) optical signal generator (e.g., a LED) and a (multiple) optical signal receiver (e.g., a light sensor).

In operation, one of the two optical input/output devices (i.e., either optical input/output device 23-1 or optical input/output device 23-2) generates a corresponding optical signal (i.e., a light wave) on each of the fiber optic cables (i.e., fiber optic cable 22-1, fiber optic cable 22-2, fiber optic cable 22-3, and fiber optic cable 22-4), while the other optical input/output device detects whether each of these optical signals is properly received at the other end of each of the corresponding fiber optic cables. If any one of these optical signals is not properly received, it indicates a likely breach of the corresponding security bar (i.e., security bar 21-1, security bar 21-2, security bar 21-3, or security bar 21-4, respectively, based on the failure of an optical signal being detected on fiber optic cable 22-1, fiber optic cable 22-2, fiber optic cable 22-3, or fiber optic cable 22-4, respectively). Advantageously, upon recognizing such a breach of one or more security bars, an identification of the breached security bar(s) may be communicated to a security system (not shown in the figure) and an appropriate alarm may be activated.

Figure 3:
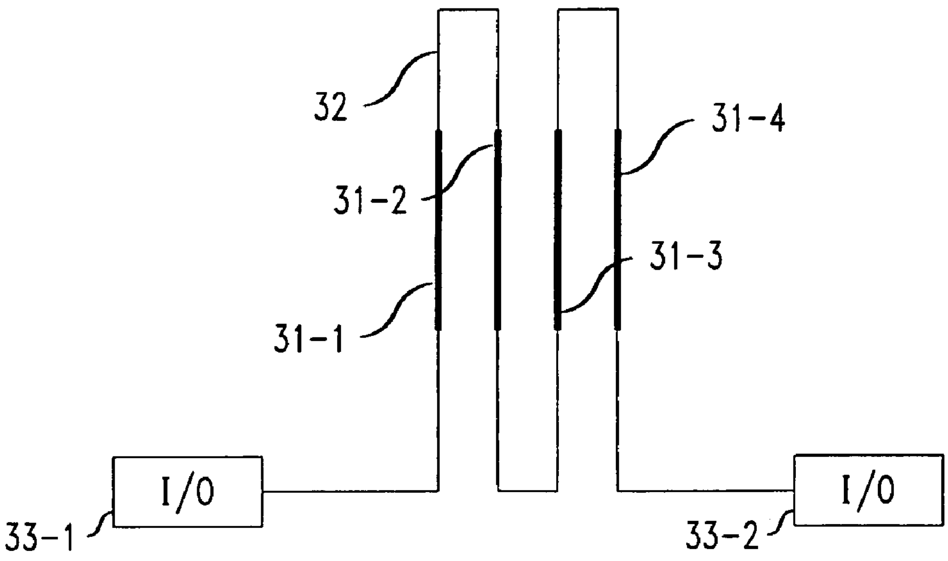
FIG. 3 shows a second illustrative system for performing security monitoring with use of a plurality of security bars with fiber optic cable embedded therein in accordance with another illustrative embodiment of the present invention.

FIG. 3 shows a second illustrative system for performing security monitoring with use of a plurality of security bars with fiber optic cable embedded therein in accordance with another illustrative embodiment of the present invention. The figure shows the second illustrative system comprising four individual security bars (i.e., security bar 31-1, security bar 31-2, security bar 31-3, and security bar 31-4) each having a single fiber optic cable (i.e., fiber optic cable 32) embedded therein according to the principles of the present invention. In particular, in accordance with this second illustrative system, a single fiber optic cable runs sequentially through each of the security bars (i.e., security bar 31-1, security bar 31-2, security bar 31-3, and security bar 31-4) in turn.

In addition, the figure shows the second illustrative system comprising two optical input/output devices (i.e., optical input/output device 33-1 and optical input/output device 33-2), each of which is advantageously capable of generating an optical signal (i.e., a light wave) and of detecting the presence or absence of such an optical signal on an optical signal input line. That is, each optical input/output device comprises a combination of an optical signal generator (e.g., a LED) and an optical signal receiver (e.g., a light sensor).

In operation, one of the two optical input/output devices (i.e., either optical input/output device 33-1 or optical input/output device 33-2) generates an optical signal (i.e., a light wave) on the fiber optic cable (i.e., fiber optic cable 32), while the other optical input/output device detects whether the optical signal is properly received at the other end of the fiber optic cable. If the optical signal is not properly received, it indicates a likely breach of one or more of the security bars (i.e., security bar 31-1, security bar 31-2, security bar 31-3, and/or security bar 31-4). Note that this second illustrative system, as shown, will not be able to isolate which one (or more) of the security bars has been breached, since only a single fiber optic cable is used. Advantageously, upon recognizing such a breach of one or more security bars, this fact may be communicated to a security system (not shown in the figure) and an appropriate alarm may be activated.

Other illustrative embodiments of the present invention include illustrative systems in which the fiber optic cable advantageously travels through another medium as well as through the security bar of the present invention. For example, in accordance with one illustrative embodiment of the present invention in which one or more security bars are advantageously incorporated into new construction, the fiber optic cable which runs through the security bars might advantageously continue through cement, cinder block, drywall, etc.

In addition, in accordance with other illustrative embodiments of the present invention, the fiber optic cable may be advantageously also used to operate as a data network within the given system. That is, digital information, in optical data form, may be advantageously communicated through the fiber optic cable between various devices (e.g., computers, television monitors, etc.) which are interconnected to the cable.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

I claim:

1. A security bar comprising:

an elongated outer member, said outer member having a longitudinally hollowed out interior chamber;

a fiber optic cable positioned longitudinally within said hollowed out interior chamber; and an isolator, the isolator comprising an elongated inner member positioned within the elongated outer member and surrounding the hollowed out interior chamber and the fiber optic cable positioned longitudinally therein, wherein the outer member comprises a first material, the isolator comprises a second material, and the first material is different than the second material, wherein the isolator is adapted to break or splinter when the security bar is substantially deformed, thereby breaking an optical signal path between two ends of the fiber optic cable indicating a security breach.

2. The security bar of claim 1 wherein said outer member comprises iron.

3. The security bar of claim 1 wherein said outer member comprises steel.

4. The security bar of claim 1 wherein said isolator comprises wood.

5. A security system comprising:

one or more security bars, each security bar comprising an elongated outer member, said outer member having a longitudinally hollowed out interior chamber, a fiber optic cable positioned longitudinally within said hollowed out interior chamber, and an isolator, the isolator comprising an elongated inner member positioned within the elongated outer member and surrounding the hollowed out interior chamber and the fiber optic cable positioned longitudinally therein, wherein the outer member comprises a first material, the isolator comprises a second material, and the first material is different than the second material;

the isolator is adapted to break or splinter when the security bar is substantially deformed, thereby breaking an optical signal path between two ends of the fiber optic cable;

an optical light source connected to a first end of the fiber optic cable positioned longitudinally within the hollowed out interior chamber of at least one of said security bars; and an optical light receiver connected to a second end of the fiber optic cable positioned longitudinally within the hollowed out interior chamber of at least one of said security bars;

wherein the optical receiver detects whether an optical signal is received at the second end of the fiber optic cable to identify a breach of a corresponding security bar if the optical signal path is broken.

6. The security system of claim 5 wherein said optical light source comprises a light emitting diode.

7. The security system of claim 5 wherein said optical light receiver comprises a light sensor.

8. The security system of claim 5 wherein (i) the fiber optic cable positioned longitudinally within the hollowed out interior chamber of each of said one or more security bars has a first end and a second end, (ii) the optical light source is connected to the first end of each of said fiber optic cables positioned longitudinally within the hollowed out interior chamber of each of said one or more security bars, and (iii) the optical light receiver is connected to the second end of each of said fiber optic cables positioned longitudinally within the hollowed out interior chamber of each of said one or more security bars.

9. The security system of claim 5 wherein (i) said one or more security bars comprises a plurality of security bars in a sequence, the sequence of security bars including a first security bar and a last security bar, (ii) the fiber optic cable positioned longitudinally within the hollowed out interior chamber of each of said plurality of security bars has a first end and a second end, (iii) the optical light source is connected to the first end of the fiber optic cable positioned longitudinally within the hollowed out interior chamber of the first security bar, (iv) the optical light receiver is connected to the second end of the fiber optic cable positioned longitudinally within the hollowed out interior chamber of the last security bar, and (v) the second end of the fiber optic cable positioned longitudinally within the hollowed out interior chamber of each of the plurality of security bars other than the last security bar is connected to the first end of the fiber optic cable positioned longitudinally within the hollowed out interior chamber of a corresponding next one of the plurality of security bars in said sequence.

10. A method of determining a security breach with use of a security system which comprises (i) one or more security bars, each security bar comprising an elongated outer member, said outer member having a longitudinally hollowed out interior chamber, a fiber optic cable positioned longitudinally within said hollowed out interior chamber, and an isolator, the isolator comprising an elongated inner member positioned within the elongated outer member and surrounding the hollowed out interior chamber and the fiber optic cable positioned longitudinally therein, wherein the outer member comprises a first material, the isolator comprises a second material, and the first material is different than the second material, wherein the isolator is adapted to break or splinter when the security bar is substantially deformed, thereby breaking an optical signal path between two ends of the fiber optic cable;

(ii) an optical light source connected to an end of the fiber optic cable positioned longitudinally within the hollowed out interior chamber of at least one of said security bars, and (iii) an optical light receiver connected to an end of the fiber optic cable positioned longitudinally within the hollowed out interior chamber of at least one of said security bars, the method comprising the steps of:

determining whether the optical light receiver is receiving light from the optical light source through the fiber optic cable positioned longitudinally within said hollowed out interior chamber of one or more of said security bars; and identifying the presence of a security breach when the optical light receiver fails to receive light from the optical light source through the fiber optic cable positioned longitudinally within said hollowed out interior chamber of at least one of said one or more of said security bars.

11. The method of claim 10 wherein the optical light source comprises a light emitting diode.

12. The method of claim 10 wherein the optical light receiver comprises a light sensor.

13. The method of claim 10 wherein (i) the fiber optic cable positioned longitudinally within the hollowed out interior chamber of each of said one or more security bars has a first end and a second end, (ii) the optical light source is connected to the first end of each of said fiber optic cables positioned longitudinally within the hollowed out interior chamber of each of said one or more security bars, and (iii) the optical light receiver is connected to the second end of each of said fiber optic cables positioned longitudinally within the hollowed out interior chamber of each of said one or more security bars, and wherein the step of identifying the presence of a security breach when the optical light receiver fails to receive light from the optical light source through the fiber optic cable positioned longitudinally within said hollowed out interior chamber of at least one of said one or more of said security bars comprises identifying said at least one of said one or more of said security bars as having been breached.

* * * * *